United States Patent
Rooney

(10) Patent No.: US 6,271,495 B1
(45) Date of Patent: Aug. 7, 2001

(54) NARROW GROOVE WELDING GAS DIFFUSER ASSEMBLY AND WELDING TORCH

(75) Inventor: Stephen J. Rooney, East Berne, NY (US)

(73) Assignee: The United States of America as represented by the Department of Energy, Washington, DC (US)

( * ) Notice: Subject to any disclaimer, the term of this patent is extended or adjusted under 35 U.S.C. 154(b) by 0 days.

(21) Appl. No.: 09/498,018

(22) Filed: Feb. 4, 2000

(51) Int. Cl.[7] ................................................. B23K 9/167
(52) U.S. Cl. .......................... 219/75; 219/125.1; 219/136
(58) Field of Search ............................... 219/75, 74, 136, 219/125.1, 125.11

(56) References Cited

U.S. PATENT DOCUMENTS

| | | | |
|---|---|---|---|
| 3,123,702 | * 3/1964 | Keidel et al. | 219/74 |
| 3,826,888 | 7/1974 | Garfield et al. | 219/74 |
| 3,924,095 | 12/1975 | Lucas, Jr. | 219/125 R |
| 4,110,590 | * 8/1978 | Batey et al. | 219/75 |
| 4,300,034 | 11/1981 | Schneider et al. | 219/75 |
| 4,309,590 | 1/1982 | Stol | 219/137.62 |
| 4,346,279 | 8/1982 | Lessmann et al. | 219/75 |
| 4,495,401 | 1/1985 | Sidorov et al. | 219/136 |
| 4,591,685 | 5/1986 | Hinger et al. | 219/74 |
| 4,617,444 | * 10/1986 | Engelhard et al. | 219/75 |
| 5,981,897 | * 11/1999 | Offer et al. | 219/75 |

* cited by examiner

Primary Examiner—Clifford C. Shaw
(74) Attorney, Agent, or Firm—Virginia B. Caress; Paul A. Gottlieb

(57) ABSTRACT

A diffuser assembly is provided for narrow groove welding using an automatic gas tungsten arc welding torch. The diffuser assembly includes a manifold adapted for adjustable mounting on the welding torch which is received in a central opening in the manifold. Laterally extending manifold sections communicate with a shield gas inlet such that shield gas supplied to the inlet passes to gas passages of the manifold sections. First and second tapered diffusers are respectively connected to the manifold sections in fluid communication with the gas passages thereof. The diffusers extend downwardly along the torch electrode on opposite sides thereof so as to release shield gas along the length of the electrode and at the distal tip of the electrode. The diffusers are of a transverse width which is on the order of the thickness of the electrode so that the diffusers can, in use, be inserted into a narrow welding groove before and after the electrode in the direction of the weld operation.

5 Claims, 1 Drawing Sheet

NARROW GROOVE WELDING GAS DIFFUSER ASSEMBLY AND WELDING TORCH

CONTRACTUAL ORIGIN OF THE INVENTION

The United States Government has rights in this invention pursuant to a contract with the Department of Energy.

BACKGROUND OF THE INVENTION

1. Field of the Invention

The present invention generally relates to automatic Gas Tungsten Arc Welding (AGTAW or GTAW) and, more particularly, to narrow groove welding torches for such welding, and to gas diffusers thereof.

2. Related Art

The AGTAW process uses welding equipment which, for a given set of welding parameters (current, voltage, travel speed and the like) performs the weld with minimal adjustments or corrections by the welding operator. As discussed below, particular problems are presented in providing a weld joint in a narrow groove in thick plates or heavy wall pipes.

Typically, a weld prep is determined by a joint geometry which requires the least amount of welding and therefore, reduces distortion and material stresses. However, it is also necessary that the joint geometry provide good accessibility for the welding torch. Welding thick plates or heavy wall pipes requires a weld joint design which allows the welding torch, or at least the electrode thereof, to be placed in the joint and the work angle of the torch adjusted into the side wall to assure a good weld tie-in as a series of weld beads are deposited layer by layer until the joint is filled.

One technique for welding thick plates requires the adjacent surfaces to be machined or otherwise prepared in advance in order to provide a "V" notch having a large volume to accommodate the welding torch. Unfortunately, while more maneuvering room is provided, multiple (24–150) weld beads per layer are required to fill the large volume created for the welding torch. Therefore, the welding process requires additional setup and machining time, preparation, filler material and shielding gas. In addition, the multiple bead layers are subject to distortion and internal stresses that result in decreased weld quality.

In an effort to reduce welding time and cost, a joint design which requires a minimal amount of welding is preferable. Narrow groove welding is a process wherein successive single bead weld layers are applied directly on top of one another in a narrow groove or joint, thus requiring a minimal amount of root opening on the order of 0.250 inches and a 0° side wall.

Briefly considering the difficulties created by the geometry and restrictiveness of the narrow grooves of the type just described, the welding torch or associated hardware must be modified to weld the entire joint from the surface since such a joint design provides insufficient room to angle or maneuver the torch in the joint. In addition, it is difficult to obtain the amount of shield gas in the weld joint necessary to protect the molten weld pool and electrode from atmospheric contamination. Moreover, in an approach where a long bare electrode is inserted into the groove and an associated diffuser is placed outside of the weld joint, there can be problems with the amount of Argon shield gas used to protect the weld pool and electrode. For example, in a confined area or work space, the shield gas rapidly replaces the oxygen available to the welding operator, thereby creating a safety concern. More generally, the high volume of shield gas required also adds to the cost of the weld.

SUMMARY OF THE INVENTION

According to the invention, there is provided a diffuser assembly for narrow groove welding, as well as a welding torch assembly utilizing the diffuser assembly. An advantage to the invention is that the diffuser assembly can be used with any conventional or commercially available automatic gas tungsten arc welding torch.

In accordance with a first aspect of the invention, a diffuser assembly is provided for narrow groove welding using an automatic gas tungsten arc welding torch including a tungsten electrode, the diffuser assembly comprising:

a manifold adapted for adjustable mounting on the welding torch, said manifold including a central opening for receiving the welding torch, a shield gas inlet, and laterally extending manifold sections in communication with said gas inlet, the manifold sections each having a gas passage therein such that shield gas supplied to the inlet passes to the gas passages of the manifold sections; and first and second tapered diffusers respectively connected to the manifold sections of the manifold in fluid communication with the gas passages thereof and extending, in use, downwardly along the torch electrode on opposite sides thereof so as to release shield gas along the length of the electrode and at the distal tip of the electrode, the diffusers being of a transverse width which is less than that of the manifold sections and which is on the order of the thickness of the electrode so that the diffusers connected to the manifold can, in use, extend into a narrow welding groove before and after the electrode in the direction of the weld operation.

Preferably, the diffuser sections each have a shape comprising a right triangle with a right angle portion disposed adjacent to the central opening.

In accordance with a second aspect of the invention, a torch assembly is provided for narrow groove welding, the torch assembly comprising:

a conventional automatic gas tungsten arc torch comprising torch body, and an adjustable electrode connected to the torch body and positioned to extend into a narrow welding groove, the electrode having a distal tip end; and a diffuser assembly mounted on the torch, the diffuser assembly comprising a manifold having a shield gas inlet, and first and second gas passages therein connected to the inlet; and first and second tapered diffusers respectively connected to said first and second gas passages of said manifold, and disposed before and after said electrode in the direction of the weld operation, the diffusers tapering down along the electrode to an area near the tip end of the electrode so as to release shield gas along the length of the electrode and in the area of the tip end, and the diffusers being of a transverse thickness on the order of that of the electrode so as to enable the diffusers to extend into a narrow welding groove before and after the electrode.

Since, as indicated above, the diffusers of the invention are thin enough to be placed in a weld joint wherein they are disposed on opposite sides of, i.e., before and after, the welding electrode, the invention can be used with a very narrow, steep welding groove. For example, with a specific implementation of the invention, a narrow groove joint with a 1° side wall and a 0.250 inch root opening, or with a 0° side wall and 0.3125 inch root opening, can be welded to a depth of 4.00 inches. In addition, by placing the diffusers into the weld joint, the amount of shield gas necessary to protect the weld pool is greatly reduced.

Further features and advantages of the present invention will be set forth in, or apparent from, the detailed description of preferred embodiments thereof which follows.

DESCRIPTION OF THE PREFERRED EMBODIMENTS

Figure 1:
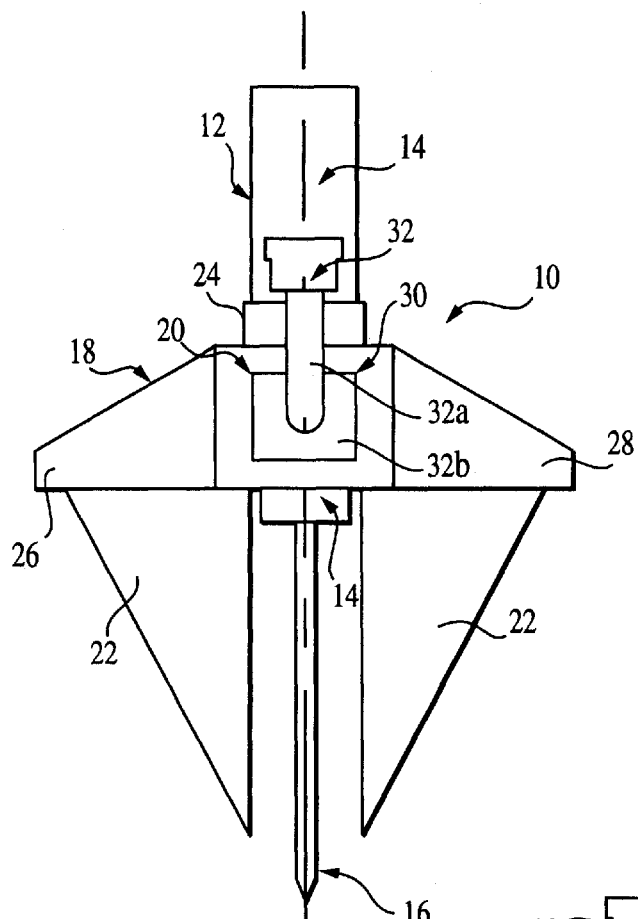
FIG. 1 shows a front view of a torch assembly including a diffuser assembly in accordance with a preferred embodiment of the invention.

Referring to FIG. 1, a welding torch assembly 10 includes a conventional AGTAW or GTAW torch 12 comprising a cylindrical torch body 14 and an elongated electrode 16. The electrode 16 is adjustable or repositionable with respect to the torch body 14 in order to maintain the minimum extension of the electrode necessary to weld. The torch 12 is mounted in a diffuser assembly 18 which basically comprises a manifold 20 and a pair of diffusers 22. The manifold 20 includes a central support member or sleeve 24 defining a central passage in which the torch body 14 is received and laterally extending manifold sections 26, 28 are disposed on opposite sides of support sleeve 24. Manifold 20 further includes a central section 30 to which is connected a shield gas inlet 32 through an inlet pipe 32a mounted on a mounting plate 32b affixed to central manifold section 30. The diffuser assembly 18 is also adjustable or repositionable on the torch body 14 in order to enable the diffusers 22 to be retracted from a joint as weld layers L are deposited as shown in FIG. 2.

The diffusers 22 are of a triangular or tapered shape as shown in FIG. 1 and are in fluid communication with the gas passages in manifold 20 so that shield gas supplied to gas inlet 32 passes through inlet pipe 32a to central manifold section 30 and thence to lateral sections 26 and 28 and ultimately to diffusers 22. The sides of the diffusers 22 that face and are parallel to the electrode 16 are open and provide for the release of the shield gas along the length and distal end of the electrode 16.

Preferably, the electrode 16 comprises a tungsten electrode, while the triangular-shaped diffusers 22 and manifold 20 are preferably formed from stainless steel sheet metal.

Figure 2:
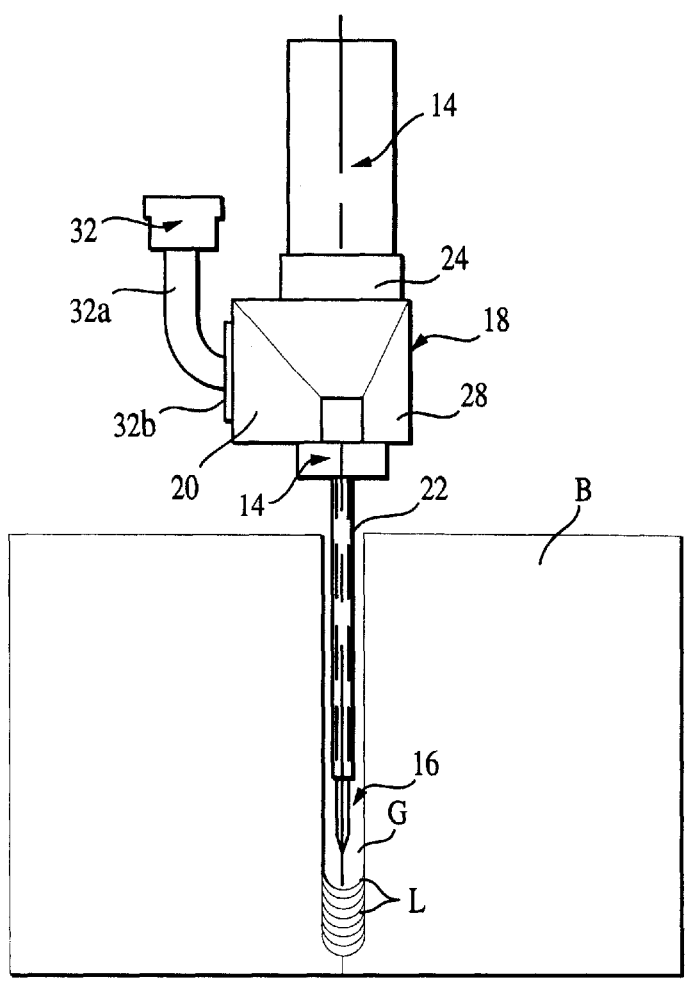
FIG. 2 shows a side view of the torch assembly of FIG. 1, showing the assembly in use in welding a narrow groove in a thick plate.

FIG. 2 shows the diffuser assembly 18 mounted on the torch body 14 in use in welding a narrow groove G in a block B. In operation, during welding, the torch body 14, and the manifold 20, remain outside the narrow groove G, while the electrode 16 and the triangular-shaped diffusers 22 extend into the narrow groove. The diffusers 22 are positioned in the narrow groove such that one diffuser is behind, and one diffuser is in front of, the electrode 16 as the latter travels through the joint. The electrode 16 is positioned to reach or extend to, the bottom of the weld, and both the electrode 16 and diffuser assembly 18 are repositioned with respect to the weld joint depth, as necessary due to the amount of weld metal deposited.

Although the invention has been described above in relation to preferred embodiments thereof, it will be understood by those skilled in the art that variations and modifications can be effected in these preferred embodiments without departing from the scope and spirit of the invention.

What is claimed is:

1. A diffuser assembly for narrow groove welding capable of use with a conventional automatic gas tungsten arc welding torch including a tungsten electrode, said diffuser assembly comprising:

a manifold adapted for adjustable mounting on said welding torch, said manifold including a central opening for receiving the welding torch, a shield gas inlet, and laterally extending manifold sections in communication with said shield gas inlet, said manifold sections each having a gas passage therein such that shield gas supplied to said inlet passes to the gas passages of said manifold sections; and first and second tapered diffusers respectively connected to said manifold sections of said manifold in fluid communication with the gas passages thereof and extending, in use, downwardly along the torch electrode on opposite sides thereof so as to release shield gas along the length of the electrode and at the distal tip of the electrode, said diffusers being of a transverse width which is less than that of the manifold sections and which is on the order of the thickness of the electrode so that the diffusers connected to said manifold can, in use, extend into a narrow welding groove on opposite sides of the electrode, said diffuser assembly being repositionable on said torch, in order to enable said diffusers to be retracted from said welding groove as weld layers are deposited.

2. A diffuser assembly as claimed in claim 1 wherein said diffuser sections each have a shape comprising a right triangle with a right angle portion disposed adjacent to said central opening, wherein the sides of said diffusers, which are parallel to and facing each other, are open to provide for release of said shield gas along said sides.

3. A torch assembly for narrow groove welding, said torch assembly comprising:

an automatic gas tungsten arc torch comprising a torch body, and an adjustable electrode connected to said torch body and adapted to extend into a narrow welding groove, said electrode having a distal tip end; and a diffuser assembly mounted on said torch body, said diffuser assembly comprising a manifold including a central opening therein for receiving said torch body, said manifold having a shield gas inlet, and first and second gas passages therein connected to said inlet; and first and second tapered diffusers respectively connected to said first and second gas passages of said manifold, and disposed on opposite sides of said electrode, said diffusers tapering down along said electrode to an area near the tip end of the electrode so as to release shield gas along the length of the electrode and in the area of said tip end, and said diffusers being of a transverse thickness on the order of that of the electrode so as to enable the diffusers to extend into a narrow welding groove on opposite sides of said electrode, wherein said electrode is adjustable with respect to the torch body in order to maintain the minimum extension of said electrode necessary to weld, and said diffuser assembly is repositionable on the torch body in order to enable said diffusers to be retracted from said welding groove as weld layers are deposited.

4. A diffuser assembly as claimed in claim 3 wherein said diffusers each have a shape comprising a right triangle with a right angle portion disposed adjacent to said central opening and wherein the sides of the diffusers that face and are parallel to the electrode are open to allow shield gas to flow along the length and distal end of the electrode.

5. A torch assembly according to claim 3, wherein said electrode comprises a nonconsumable tungsten electrode.

* * * * *